US011523421B2

(12) United States Patent
Qi

(10) Patent No.: US 11,523,421 B2

(45) Date of Patent: Dec. 6, 2022

(54) REFERENCE SIGNAL CONFIGURATION IN A TELECOMMUNICATION SYSTEM

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 16/969,792

(22) PCT Filed: Feb. 15, 2019

(86) PCT No.: PCT/KR2019/001871

§ 371 (c)(1),
(2) Date: Aug. 13, 2020

(87) PCT Pub. No.: WO2019/160375

PCT Pub. Date: Aug. 22, 2019

(65) Prior Publication Data

US 2021/0007125 A1 Jan. 7, 2021

(30) Foreign Application Priority Data

Feb. 16, 2018 (GB) ..................................... 1802543

(51) Int. Cl.
*H04W 72/12* (2009.01)
*H04L 5/00* (2006.01)

(52) U.S. Cl.
CPC ....... *H04W 72/1289* (2013.01); *H04L 5/0048* (2013.01); *H04W 72/1273* (2013.01)

(58) Field of Classification Search
None
See application file for complete search history.

(56) References Cited

U.S. PATENT DOCUMENTS

2017/0302495 A1 10/2017 Islam et al.
2019/0150124 A1* 5/2019 Nogami ................ H04L 5/0044 370/330

(Continued)

FOREIGN PATENT DOCUMENTS

| EP | 3738266 A1 | 11/2020 |
|---|---|---|
| EP | 3753167 A1 | 12/2020 |
| WO | 2019/147362 A1 | 8/2019 |

OTHER PUBLICATIONS

Spreadtrum Communications: "Remaining issues on DL RS multiplexing", 3GPP Draft; R1-1719691, 3rd Generation Partnership Project (3GPP), Mobile Competence Centre; 650, Route Des Lucioles ; F-06921 Sophia-Antipolis Cedex; France, vol. RAN WG1, no. Reno, USA; XP051368849, Nov. 17, 2017.

(Continued)

*Primary Examiner* — Phirin Sam

(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of configuring a telecommunication system comprising the step of mapping a Phase Tracking Reference Signal, PTRS, to a set of Resource Elements, RE, around Resource Elements not available to Physical Downlink Shared Channel, PDSCH, scheduled to a User Equipment, UE, wherein a transmitted mapping pattern in a Resource Element that overlaps with a configured (Continued)

CORESET or detected Physical Downlink Control Channel, PDCCH, is dependent upon a configuration of the PDSCH scheduled to the UE.

16 Claims, 6 Drawing Sheets

(56) References Cited

U.S. PATENT DOCUMENTS

| | | | | |
|---|---|---|---|---|
| 2019/0158205 | A1* | 5/2019 | Sheng | H04B 7/0626 |
| 2019/0230708 | A1* | 7/2019 | Bai | H04L 1/0013 |
| 2019/0296877 | A1* | 9/2019 | Zhang | H04L 5/0048 |
| 2020/0067676 | A1* | 2/2020 | Yi | H04W 72/042 |
| 2020/0092062 | A1* | 3/2020 | Yum | H04L 5/0091 |
| 2020/0112355 | A1* | 4/2020 | Park | H04B 7/0626 |
| 2020/0374967 | A1* | 11/2020 | Nogami | H04W 80/08 |
| 2021/0058207 | A1* | 2/2021 | Lee | H04L 5/0053 |
| 2021/0168011 | A1* | 6/2021 | Davydov | H04L 27/2675 |
| 2021/0185683 | A1* | 6/2021 | Reial | H04W 72/0493 |
| 2021/0211232 | A1* | 7/2021 | Hwang | H04L 5/00 |
| 2021/0385789 | A1* | 12/2021 | Jung | H04W 72/042 |

OTHER PUBLICATIONS

Spreadtrum Communications: "On RS multiplexing", 3GPP Draft; R1-1713051, 3rd Generation Partnership Project (3GPP), Mobile Competence Centre; 650, Route Des Lucioles; F-06921 Sophia-Antipolis Cedex; France, vol. RAN WG1, no. Prague, Czech Rep; XP051315860, Aug. 20, 2017.

Ericsson: "Feature lead summary 3 of PT-RS", 3GPP Draft; R1-1801244 Feature Lead Summary 3 of PTRS, 3rd Generation Partnership Project (3GPP), Mobile Competence Centre; 650, Route Des Lucioles; F-06921 Sophia-Antipolis Cedex; France, vol. RAN WG1, no. Vancouver, Canada; XP051385464, Jan. 29, 2018.

European Search Report dated Feb. 15, 2021, issued in European Application No. 19753952.1.

LG Electronics, 'Remaining issues on rate matching resources', R1-1719937, 3GPP TSG RAN WG1 Meeting 91, Reno, USA, Nov. 18, 2017.

Huawei et al., 'Summary of remaining issues of PTRS',R1-1800087, 3GPP TSG RAN WG1 Ad Hoc Meeting, Vancouver, Canada, Jan. 12, 2018.

Lenovo et al., 'Corrections on PTRS', R1-1800394, 3GPP TSG RAN WG1 Meeting AH 1801, Vancouver, Canada, Jan. 12, 2018.

Spreadtrum Communications, 'Remaining issues on PT-RS', R1-1800273, 3GPPTSG RAN WG1 Meeting AH 1801, Vancouver, Canada, Jan. 12, 2018.

Combined Search and Examination Report dated Feb. 28, 2020, issued in International Application No. GB.1902049.4.

United Kingdom Search Report dated Apr. 28, 2021, issued in United Kingdom Patent Application No. GB2104034.0.

* cited by examiner

[Fig. 1]
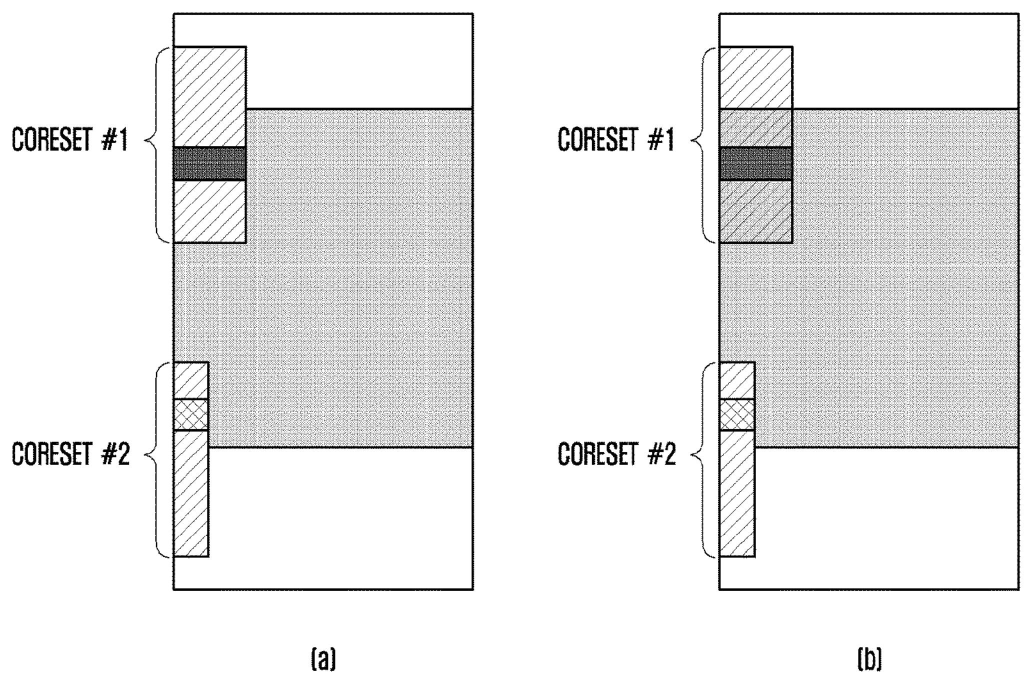
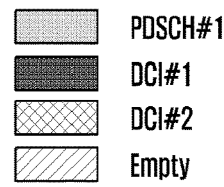
[Fig. 2]
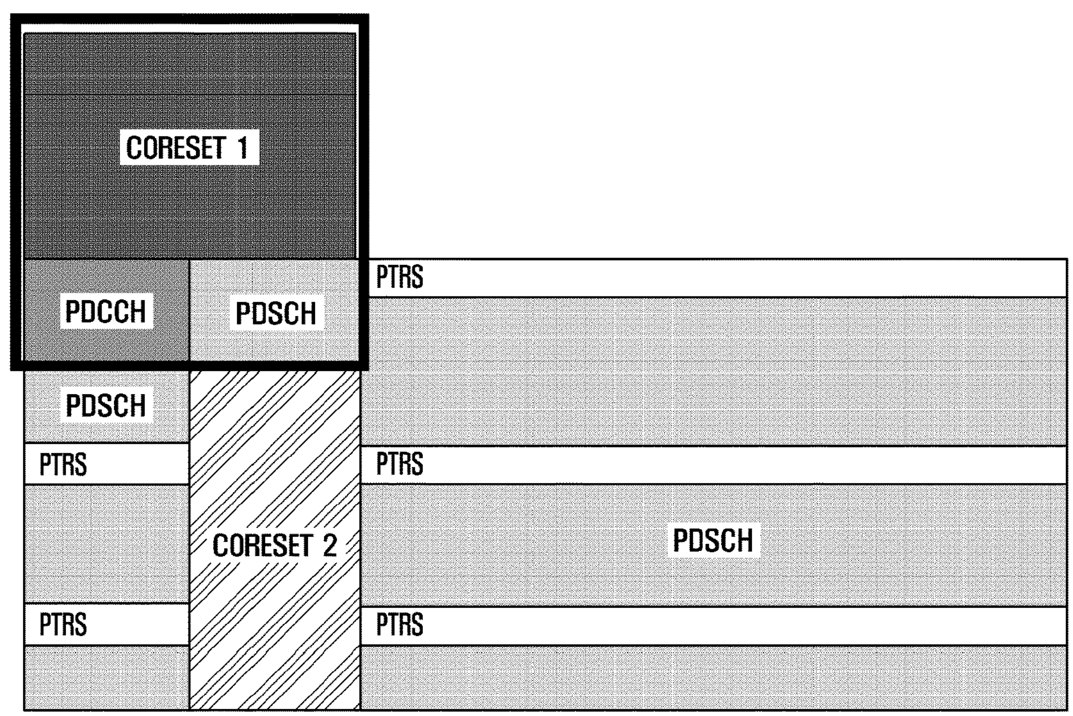

[Fig. 3]
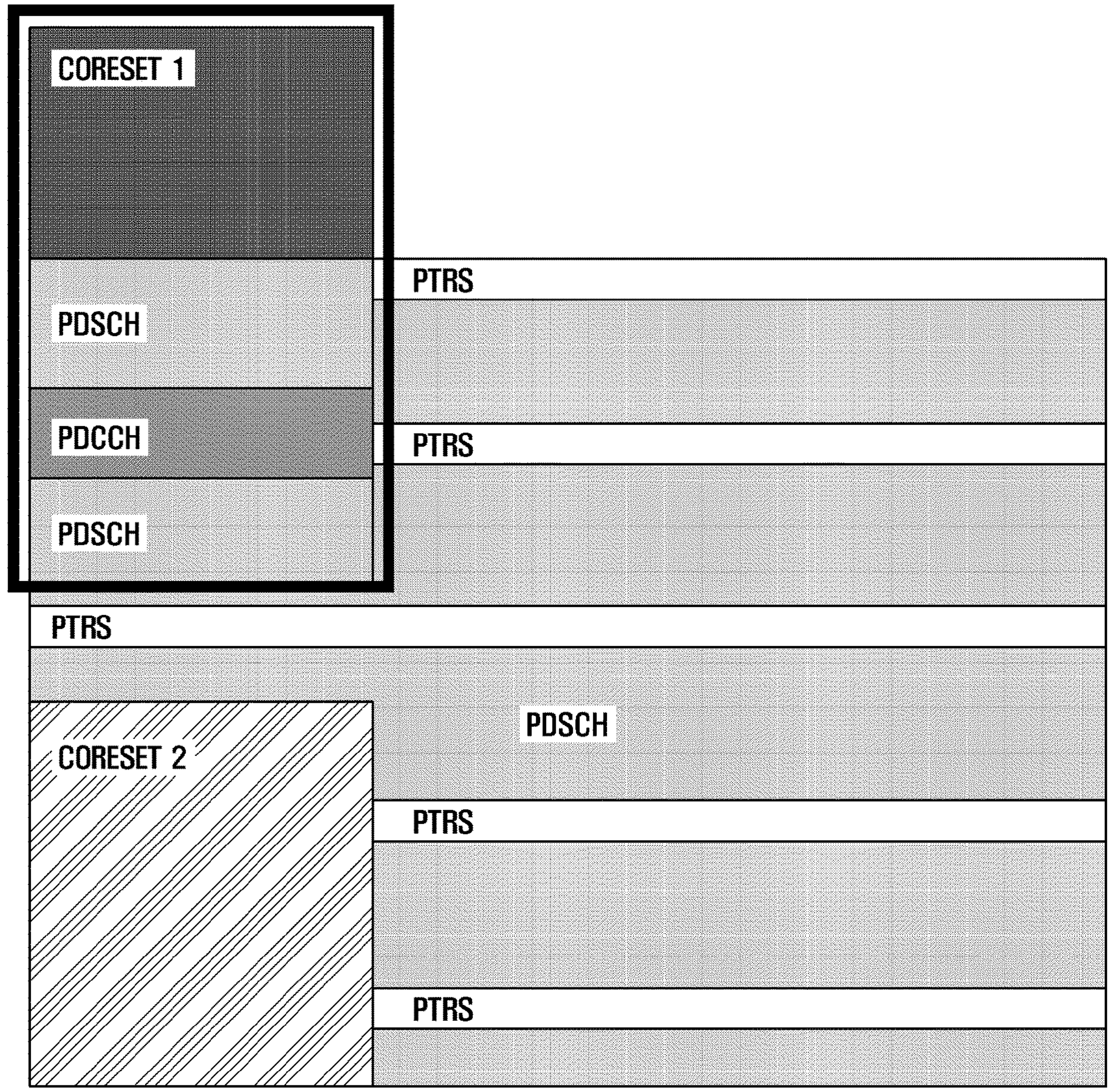

[Fig. 4]
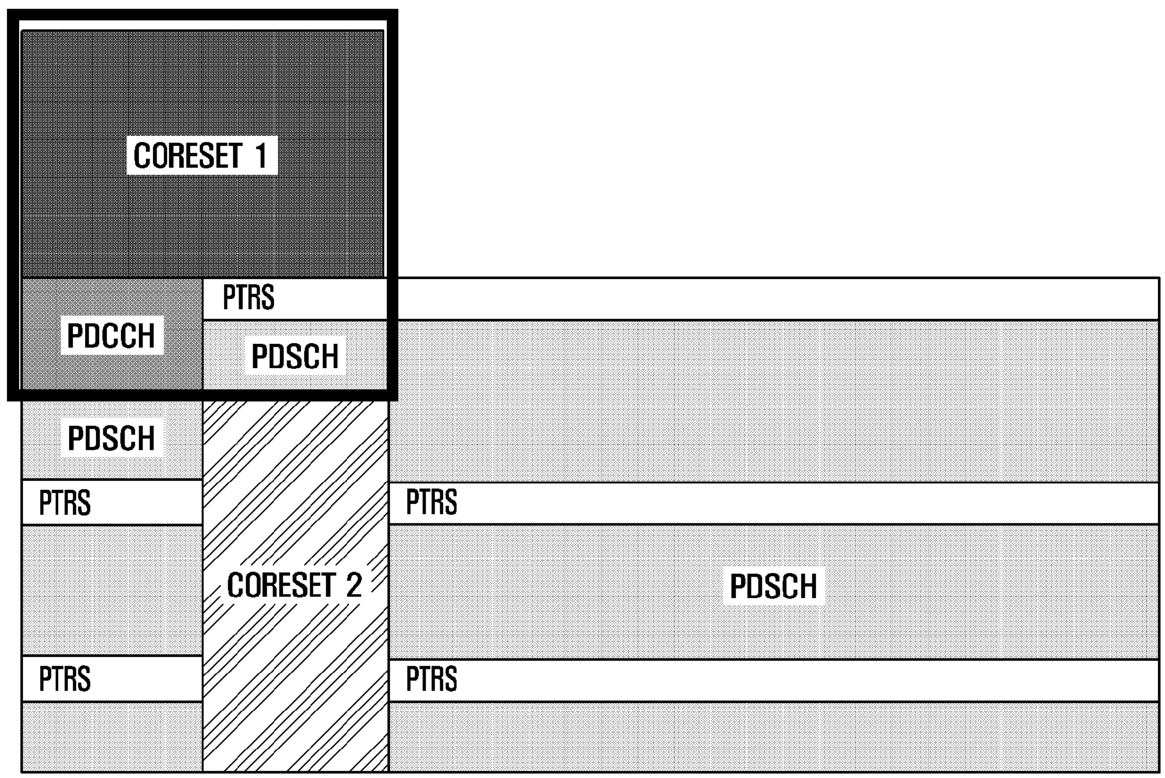

[Fig. 5]
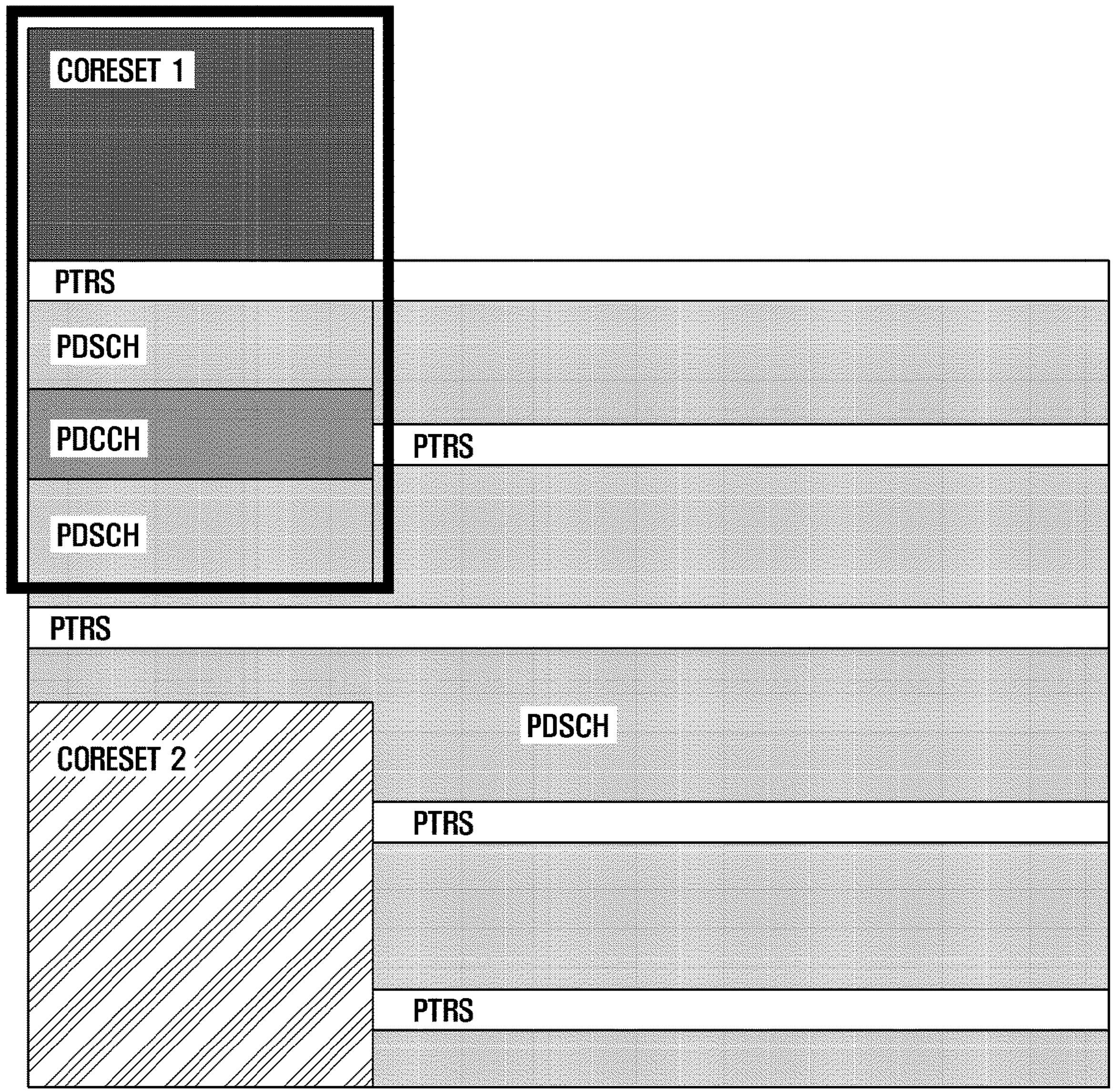

[Fig. 6]
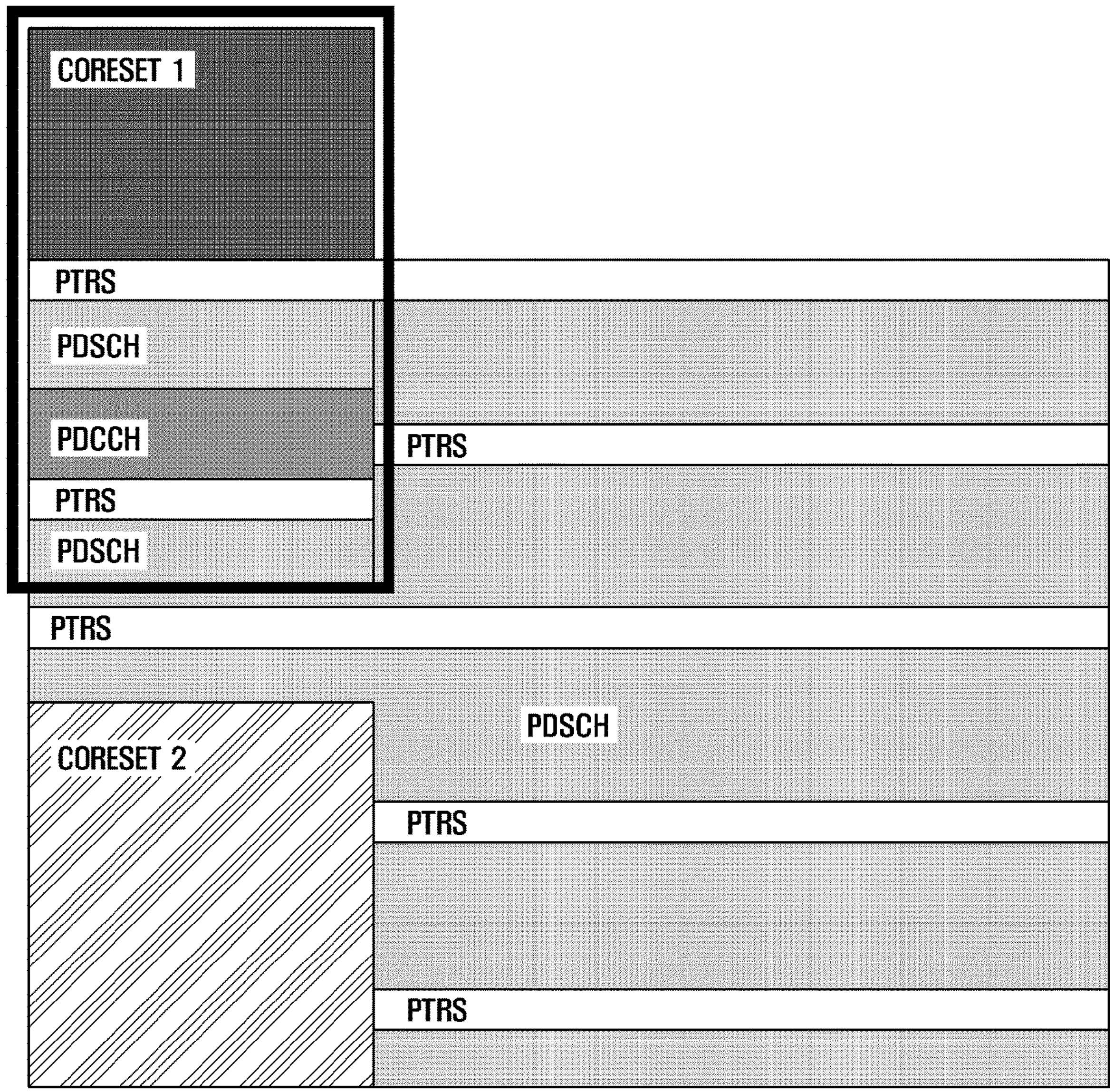

[Fig. 7]
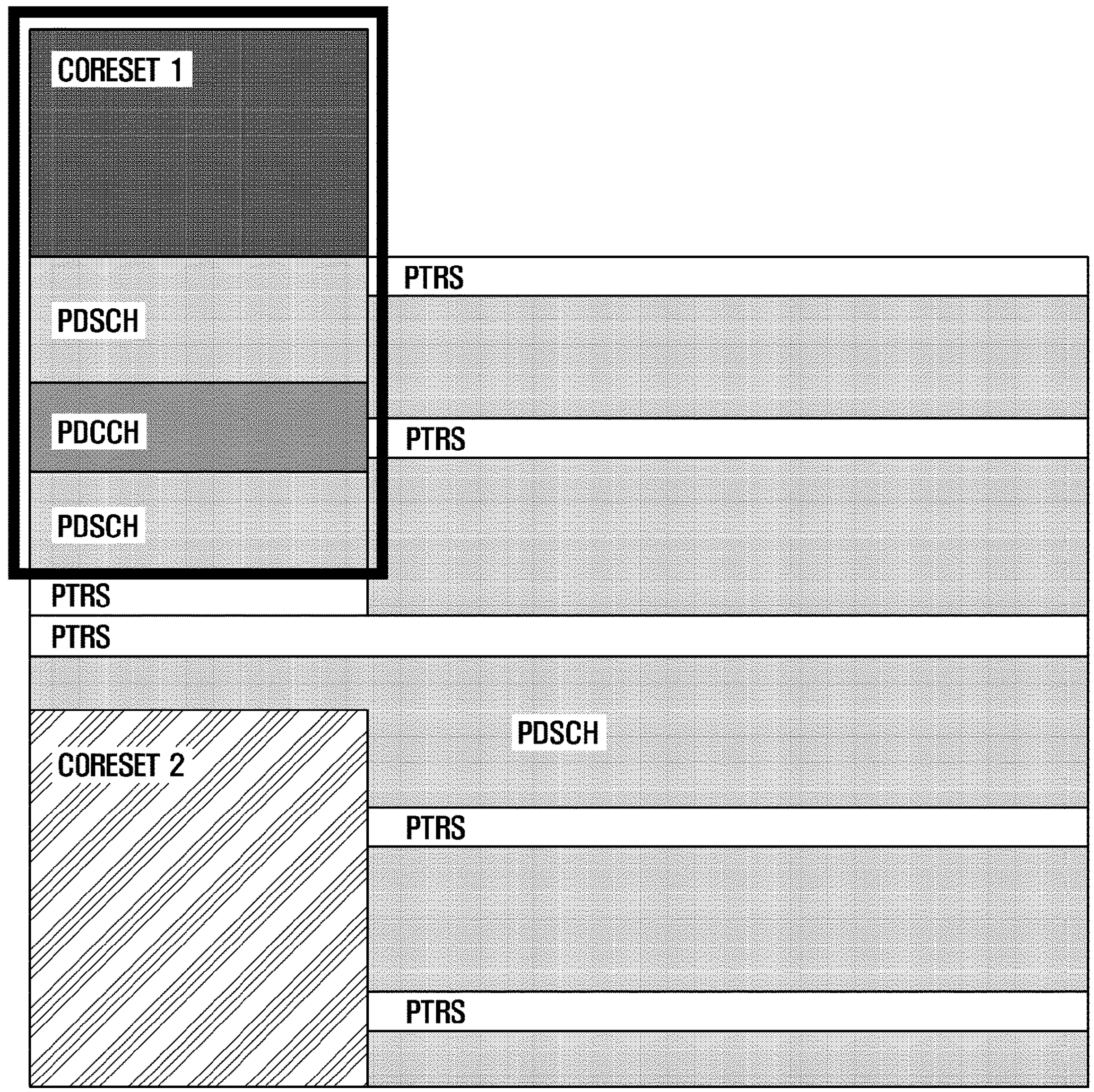

REFERENCE SIGNAL CONFIGURATION IN A TELECOMMUNICATION SYSTEM

TECHNICAL FIELD

The present invention relates to reference signal configuration in a telecommunication system. It particularly, but not exclusively, relates to configuration of Phase Tracking Reference Signal (PTRS) in a 5th Generation (5G) or New Radio (NR) system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

It has been agreed that dynamic resource sharing between channels PDCCH and PDSCH is supported in NR to maximize spectral efficiency. Resource sharing means that PDSCH can be transmitted within a CORESET if available. A control-resource set (CORESET) consists of $N_{RB}^{CORESET}$ resource blocks in the frequency domain, given by the higher-layer parameter CORESET-freq-dom, and $N_{symb}^{CORESET} \in \{1,2,3\}$ symbols in the time domain, given by the higher-layer parameter CORESET-time-dur, where $N_{symb}^{CORESET}=3$ is supported only if higher-layer parameter DL-DMRS-typeA-pos equals 3. In terms of resource sharing granularity, there are two alternatives, CORESET-level and DCI-level resource sharing, as shown in FIG. 1.

FIG. 1 shows two CORESETs, CORESET #1 for UE #1 and CORESET #2 for UE #2, which are configured within a system bandwidth. DCI #1 for UE #1 is transmitted in CORESET #1 and DCI #2 for UE #2 is transmitted in CORESET #2. DCI #1 corresponds to the DL assignment DCI of PDSCH #1 for UE #1. PDSCH #1 is transmitted in the system bandwidth and some part of PDSCH #1 is overlapped with existing CORESETs.

DISCLOSURE OF INVENTION

Technical Problem

Both CORESET-level (FIG. 1(*a*)) and DCI-level (FIG. 1(*b*)) resource sharing have been agreed in the 3GPP standardisation process. However, it has been agreed that PTRS should be punctured/removed for the entire CORESET to avoid collision, which will introduce problems in the DCI-level sharing case shown in FIG. 1 *b*). Embodiments of this invention seek to address this problem.

Solution to Problem

According to the present invention there is provided an apparatus and method as set forth. Other features of the invention will be apparent from the description which follows.

According to an aspect of the present invention, there is provided a method of configuring a telecommunication system comprising the step of mapping a Phase Tracking Reference Signal, PTRS, to a set of Resource Elements, RE, around Resource Elements not available to Physical Downlink Shared Channel, PDSCH, scheduled to a User Equipment, UE, wherein a transmitted mapping pattern in a Resource Element that overlaps with a configured CORESET or detected Physical Downlink Control Channel, PDCCH, is dependent upon a configuration of the PDSCH scheduled to the UE.

In an embodiment, the PTRS, as mapped, is punctured in a case where it overlaps with an RE occupied by a configured PDCCH/DCI/Grant.

According to an aspect of the present invention, there is provided a method of configuring a telecommunication system comprising the step of mapping a PTRS to a set of Resource Elements, RE, around resource elements not available to PDSCH scheduled to a UE, wherein PTRS, according to a mapping pattern, is not transmitted in an RE that overlaps with a configured PDCCH/DCI/Grant when rate matching of the PDSCH scheduled to the UE is around PDCCH/DCI/Grant.

In an embodiment, the PTRS, as mapped, is punctured in a case where it overlaps with an RE occupied by a configured PDCCH/DCI/Grant.

According to an aspect of the present invention, there is provided a method of configuring a telecommunication system comprising the step of mapping a PTRS to a set of Resource Elements around Resource Elements not available to PDSCH scheduled to a UE, wherein PTRS, as mapped, is not transmitted in an RE that overlaps with a configured CORESET when rate matching of a PDSCH scheduled to the UE is around CORESET.

In an embodiment, the PTRS, as mapped, is punctured in a case where it overlaps with an RE occupied by a configured CORESET.

According to an aspect of the present invention, there is provided a method of configuring a telecommunication system comprising the step of mapping a PTRS to a set of Resource Elements around Resource Elements not available to PDSCH scheduled to a UE, wherein the configuring is based on higher layer signalling.

In an embodiment, the higher layer signalling is signalling for configuring around CORESET and/or PDSCH.

According to an aspect of the present invention, there is provided a non-transitory data carrier carrying control code to implement the methods of any of the preceding method aspects.

According to an aspect of the present invention, there is provided apparatus arranged to perform the method of any of the preceding method aspects.

According to an aspect of the present invention, there is provided a method of reference signal configuration in a telecommunication system.

Embodiments relate to configuration of PTRS in particular.

An embodiment relates to whether or not the PTRS according to a mapping pattern is transmitted in an RE that overlaps with a configured CORESET depends on rate matching of the PDSCH scheduled to the UE.

An embodiment relates to whether the PT-RS according to the mapping pattern is not transmitted in an RE that overlaps with a configured CORESET when rate matching of the PDSCH scheduled to the UE is around CORESET.

An embodiment relates to whether the PT-RS according to the mapping pattern is not transmitted in RE that overlaps with a configured PDCCH/DCI/Grant when rate matching of the PDSCH scheduled to the UE is around PDCCH/DCI/grant.

Although a few preferred embodiments of the present invention have been shown and described, it will be appreciated by those skilled in the art that various changes and modifications might be made without departing from the scope of the invention.

Advantageous Effects of Invention

The present invention relates to reference signal configuration in a telecommunication system.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1 shows a representation of resource-sharing granularity;

FIG. 2 shows a representation of CORESET, PDSCH and PTRS according to an embodiment of the invention;

FIG. 3 shows a further representation of CORESET, PDSCH and PTRS according to an embodiment of the invention;

FIG. 4 shows a representation of PTRS puncturing around PDCCH/DCI/grant only according to an embodiment of the invention;

FIG. 5 shows a representation of PTRS puncture according to an embodiment of the invention;

FIG. 6 shows a representation of PTRS shift, matching around PDCCH/DCI/grant, according to an embodiment of the invention; and FIG. 7 shows a representation of PTRS shift, matching around CORESET, according to an embodiment of the invention.

MODE FOR THE INVENTION

A User Equipment (UE) can be configured with multiple CORESETs, where it will search for its own DCI scheduling its own PDSCH as shown in FIG. 2. PDSCH of a UE can be rectangular or a combination of several rectangles, where each rectangle represents a bundle of time and frequency resource blocks. The vertical axis is frequency and the horizontal axis is time in terms of symbol.

In FIG. 2, CORESET 1 is configured to UE 1 and it contains PDCCH/DCI/grant for UE 1. For DCI-level rate matching, part of CORESET 1 can be shared by PDSCH. CORESET 2 is configured to another UE (or UEs) and it cannot be used by UE 1 PDSCH, i.e., the UE has to do rate matching around CORESET 2. If PTRS needs to be punctured around configured CORESET, it may not be deployed in the second part of PDSCH, which is contained in CORESET 1, or CORESET 2, which is configured to another UE (or UEs). In such a case, common phase error (CPE) compensation can not be done for the second part of PDSCH. It may not be a big problem when the Modulation Coding Scheme (MCS) level is low and PTRS time density is also low. However, if the MCS level is high and PTRS time density is high, e.g., PTRS is deployed in every symbol, it will cause performance degradation.

As shown in FIG. 3, if rate matching is around CORESET, there may be a much lower number of sub-carriers carrying PTRS in some part of PDSCH. For example, in the right-hand part of PDSCH in FIG. 3, there are 5 PTRSs but in the left-hand part of PDSCH, there is only 1 PTRS. This will cause significant performance loss for the first (left-hand) part of PDSCH.

In order to avoid performance loss because of the cases identified in FIGS. 2 and 3, PTRS is extended inside CORESET, if the UE performs rate matching around PDCCH/DCI/grant as shown in FIG. 4.

When PTRS collides with PDCCH/DCI/grant inside CORESET, alternate embodiments are presented as follows:

- Option 1: when UE does rate matching around PDCCH/DCI/grant only, PTRS is maintained in resources within CORESET but shared with PDSCH and only punctured around PDCCH/DCI/grant scheduling the UE's PDSCH if PTRS collides with PDCCH or DCI.
- Option 2: when UE does rate matching around PDCCH/DCI/grant only, PTRS is kept in resources within CORESET but shared with PDSCH and shifted around PDCCH/DCI/grant scheduling the UE's PDSCH if it collides with PDCCH/DCI/grant.

Option 3: when UE does rate matching around PDCCH/DCI/grant only, PTRS is kept in resources within CORESET but shared with PDSCH and shifted or punctured around PDCCH or DCI scheduling the UE's PDSCH if it collides with PDCCH/DCI/grant. The UE can switch between puncturing and shifting in a dynamic or semi-persistent way.

Option 1 can be seen in FIG. 5, where PTRS is extended to the second part of PDSCH and therefore CPE can be compensated. When PTRS collides with PDCCH/DCI/grant, it is punctured. In this example, there are two instead of only one PTRSs in the first part (left-hand side) of PDSCH so that the CPE can be compensated in a better way than that shown in FIG. 3.

A benefit of Option 1 is that it requires less reference signaling overhead.

Option 2 can be seen in FIG. 6, where PTRS is shifted to avoid collision with PDCCH/DCI/grant. In this example, there are three instead of only one PTRS in the first part (left-hand side) of PDSCH so that the CPE can be compensated in a better way. Option 3, thus, offers more flexibility and improved performance, but may require more signaling for the switching which is required.

FIG. 7 relates to a still further technique for PTRS matching around CORESET. Here, PTRS still matches CORESET when it collides with CORESET but instead of puncturing, as shown in FIG. 5, shifting is employed. This solution also offers improved CPE compensation performance.

Multiple CORESETs can be configured to a UE by RRC messaging but the starting symbol of PDSCH can be explicitly signaled to the UE in a dynamic way. With such information, the UE can figure out which part or parts of CORESETs can be shared by the PDSCH and can therefore configure PTRS inside those configured CORESETs. However, PTRS is not always needed for the PDSCH part inside a CORESET. It depends on the following criteria:

The size of the resources inside CORESET but shared by PDSCH. if the size is relatively small, the loss due to PTRS matched around CORESET is negligible and therefore there is no need to configure PTRS inside CORESET. Note this size should be compared with the size of PDSCH resources outside CORESET but on the same symbols.

Time density of PTRS. Since CORESET only occupies up to 3 symbols, if the time density of PTRS is only one PTRS for every 4 symbols, there is no need to have PTRS inside CORESET, since CPE can be estimated by using interpolation. Note that time density of PTRS depends on the MCS level.

Frequency density of PTRS. If PTRS frequency density is large, e.g., 1 PTRS per 8 RBs, even with large size of the resources inside CORESET, matching around PDCCH/DCI/grant may not be necessary since the number of punctured PTRS could be small.

The above criteria should all be considered by the base station (gNB) when deciding which PTRS matching mode to employ. However, the UE can also recommend thresholds to the network in UE reporting. There are three options as below:

Option 1: PTRS is configured in a predefined way: some thresholds for the above identified criteria are pre-defined and PTRS configuration is implicitly derived based on the pre-defined thresholds and other necessary signaling, e.g., the signaling used to configure CORESET(s) and PDSCH.

Option 2: PTRS is configured in a semi-persistent way: the thresholds can be semi-persistently configured by high layer signaling, e.g., RRC, and PTRS configuration is implicitly derived based on the RRC configured thresholds and other necessary signaling, e.g., signaling used to configure CORESET(s) and PDSCH.

Option 3: PTRS is configured in a dynamic way: the gNB dynamically chooses aforementioned PTRS configurations and indicates the chosen configuration to UE in low layer signaling, e.g., DCI.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a terminal in a mobile communication system, the method comprising:

receiving, from a base station, a message including first configuration information for a control resource set (CORESET) and second configuration information for a rate match pattern associated with a physical downlink shared channel (PDSCH);

detecting a physical downlink control channel (PDCCH) in the CORESET identified based on the first configuration information, the PDCCH scheduling the PDSCH;

identifying resource elements (REs) for the PDSCH and a part of the REs for the PDSCH that overlaps with the CORESET; and receiving, from the base station, at least one phase-tracking reference signal (PT-RS) for the PDSCH, wherein whether the at least one PT-RS is not mapped to the part of the REs for the PDSCH that overlaps with the CORESET or is mapped to the part of the REs for the PDSCH that overlaps with the CORESET but is not mapped to REs for the detected PDCCH is determined based on downlink control information (DCI) carried by the PDCCH.

2. The method of claim 1, wherein the first configuration information includes information on frequency domain resources and time domain resources associated with the CORESET.

3. The method of claim 1, wherein the at least one PT-RS is mapped to REs which are not used for the detected PDCCH.

4. The method of claim 1, wherein the part of the REs for the PDSCH that overlaps with the CORESET is determined to be not used for the PDSCH based on the rate match pattern according to the second configuration information.

5. A method performed by a base station in a mobile communication system, the method comprising:

transmitting, to a terminal, a message including first configuration information for a control resource set (CORESET) and second configuration information for a rate match pattern associated with a physical downlink shared channel (PDSCH);

transmitting, to the terminal, a physical downlink control channel (PDCCH) in the CORESET identified based on the first configuration information, the PDCCH scheduling the PDSCH;

identifying resource elements (REs) for the PDSCH and a part of the REs for the PDSCH that overlaps with the CORESET; and transmitting, to the terminal, at least one phase-tracking reference signal (PT-RS) for the PDSCH, wherein whether the at least one PT-RS is not mapped to the part of the REs for the PDSCH that overlaps with the CORESET or is mapped to the part of the REs for the PDSCH that overlaps with the CORESET but is not mapped to REs for the PDCCH is determined based on downlink control information (DCI) carried by the PDCCH.

6. The method of claim 5, wherein the first configuration information includes information on frequency domain resources and time domain resources associated with the CORESET.

7. The method of claim 5, wherein the at least one PT-RS is mapped to REs which are not used for the PDCCH.

8. The method of claim 5, wherein the part of the REs for the PDSCH that overlaps with the CORESET is determined to be not used for the PDSCH based on the rate match pattern according to the second configuration information.

9. A terminal in a mobile communication system, the terminal comprising:

a transceiver; and a controller configured to:

receive, from a base station via the transceiver, a message including first configuration information for a control resource set (CORESET) and second configuration information for a rate match pattern associated with a physical downlink shared channel (PDSCH), detect a physical downlink control channel (PDCCH) in the CORESET identified based on the first configuration information, the PDCCH scheduling the PDSCH, identify resource elements (REs) for the PDSCH and a part of the REs for the PDSCH that overlaps with the CORESET, and receive, from the base station via the transceiver, at least one phase-tracking reference signal (PT-RS) for the PDSCH, wherein whether the at least one PT-RS is not mapped to the part of the REs for the PDSCH that overlaps with the CORESET or is mapped to the part of the REs for the PDSCH that overlaps with the CORESET but is not mapped to REs for the detected PDCCH is determined based on downlink control information (DCI) carried by the PDCCH.

10. The terminal of claim 9, wherein the first configuration information includes information on frequency domain resources and time domain resources associated with the CORESET.

11. The terminal of claim 9, wherein the at least one PT-RS is mapped to REs which are not used for the detected PDCCH.

12. The terminal of claim 9, wherein the part of the REs for the PDSCH that overlaps with the CORESET is determined to be not used for the PDSCH based on the rate match pattern according to the second configuration information.

13. A base station in a mobile communication system, the base station comprising:

a transceiver; and a controller configured to:

transmit, to a terminal via the transceiver, a message including first configuration information for a control resource set (CORESET) and second configuration information for a rate match pattern associated with a physical downlink shared channel (PDSCH), transmit, to the terminal via the transceiver, a physical downlink control channel (PDCCH) in the CORESET identified based on the first configuration information, the PDCCH scheduling the PDSCH, identify resource elements (REs) for the PDSCH and a part of the REs for the PDSCH that overlaps with the CORESET, and transmit, to the terminal via the transceiver, at least one phase-tracking reference signal (PT-RS) for the PDSCH, wherein whether the at least one PT-RS is not mapped to the part of the REs for the PDSCH that overlaps with the CORESET or is mapped to the part of the REs for the PDSCH that overlaps with the CORESET but is not mapped to REs for the PDCCH is determined based on downlink control information (DCI) carried by the PDCCH.

14. The base station of claim 13, wherein the first configuration information includes information on frequency domain resources and time domain resources associated with the CORESET.

15. The base station of claim 13, wherein the at least one PT-RS is mapped to REs which are not used for the PDCCH.

16. The base station of claim 13, wherein the part of the REs for the PDSCH that overlaps with the CORESET is determined to be not used for the PDSCH based on the rate match pattern according to the second configuration information.

* * * * *